(12) United States Patent
Cash, III

(10) Patent No.: US 7,377,378 B2
(45) Date of Patent: May 27, 2008

(54) CARRIER CHAIN WITH AN IMPROVED LINK

(75) Inventor: John W. Cash, III, Dallas, GA (US)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 11/532,411

(22) Filed: Sep. 15, 2006

(65) Prior Publication Data

US 2007/0056833 A1    Mar. 15, 2007

Related U.S. Application Data

(60) Provisional application No. 60/717,569, filed on Sep. 15, 2005.

(51) Int. Cl.
*B65G 17/34* (2006.01)
(52) U.S. Cl. .................. 198/803.11; 198/867.15; 198/817
(58) Field of Classification Search ................ 198/817, 198/867.15, 803.11, 731, 732, 850, 853
See application file for complete search history.

(56) References Cited

U.S. PATENT DOCUMENTS

| | | | | |
|---|---|---|---|---|
| 3,608,701 A | * | 9/1971 | Dieter | 198/817 |
| 3,779,364 A | * | 12/1973 | Kammann | 198/803.11 |
| 3,809,210 A | * | 5/1974 | Anderson | 198/803.11 |
| 4,159,056 A | | 6/1979 | Pirman et al. | |
| 5,143,204 A | | 9/1992 | Owen et al. | |
| 5,328,021 A | * | 7/1994 | Calvert et al. | 198/803.11 |
| 5,337,887 A | * | 8/1994 | Greenwell et al. | 198/867.15 |
| 5,544,738 A | * | 8/1996 | Klopfenstein | 198/803.11 |
| 5,546,734 A | | 8/1996 | Moncrief et al. | |
| 5,560,473 A | * | 10/1996 | Ivancso et al. | 198/803.11 |
| 5,806,659 A | * | 9/1998 | Middelberg et al. | 198/731 |
| 5,911,303 A | | 6/1999 | Malanowski | |
| 6,471,041 B1 | | 10/2002 | Long et al. | |

* cited by examiner

*Primary Examiner*—James R Bidwell
(74) *Attorney, Agent, or Firm*—Parks Knowlton LLC

(57) ABSTRACT

A carrier chain includes an attachment link with a wing to limit the tilt of a support member. The wing extends from a base portion of a plate of the attachment link toward a plate of a pin link. When the attachment link begins to rotate in reaction to a force that is applied to the support member, the lower edge of the wing contacts upper edge of the plate of the pin link such that the adjacent roller link is constrained to be generally in line and to rotate with the attachment link. By extending the pitch between reaction rollers that contact upper and lower surfaces of a guide track, the attachment link restricts the rotational displacement of the support member.

17 Claims, 7 Drawing Sheets

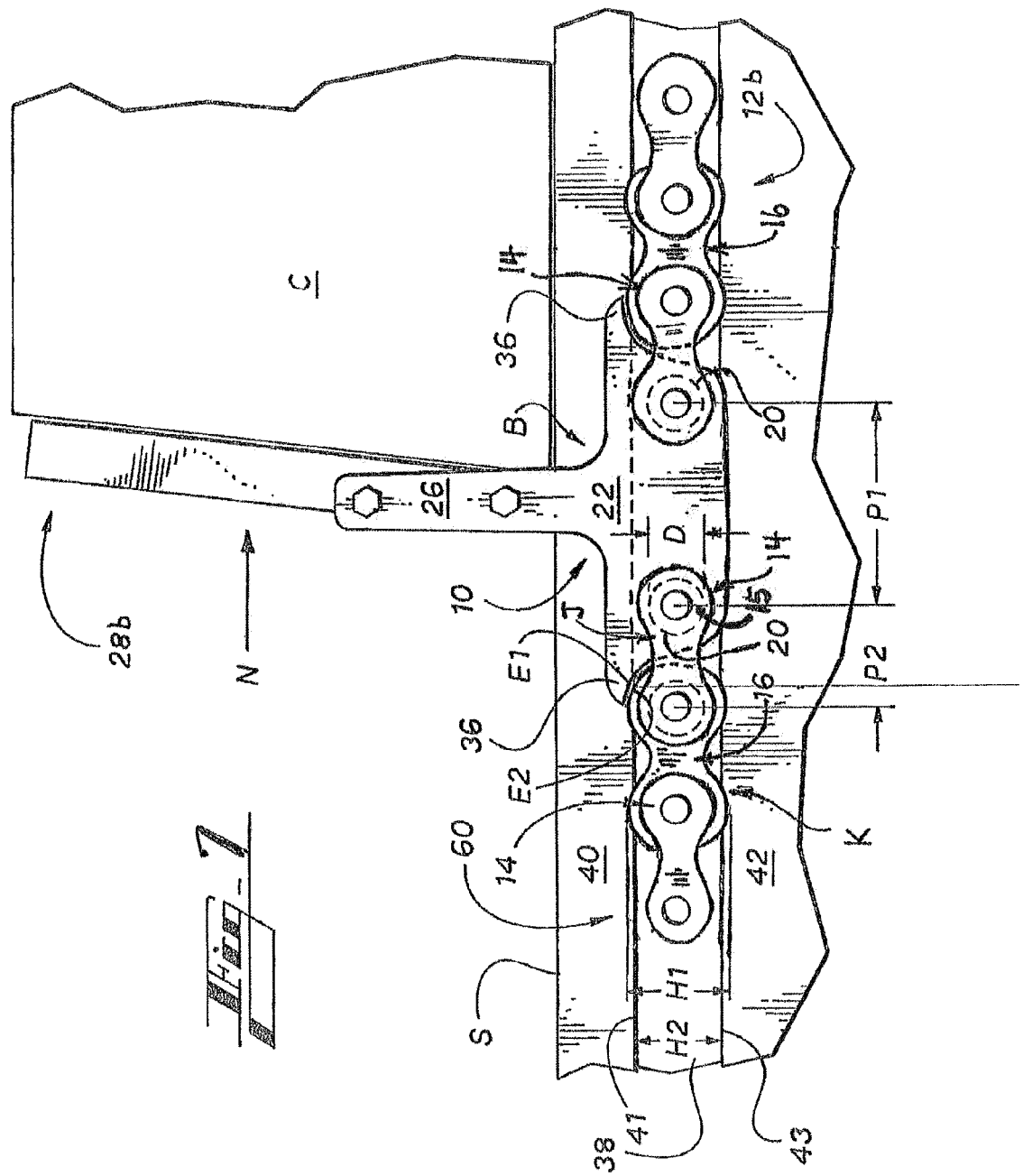

CARRIER CHAIN WITH AN IMPROVED LINK

CROSS REFERENCE TO RELATED APPLICATIONS

This application claims priority to U.S. Provisional Application No. 60/717,569, filed Sep. 15, 2005, the entirety of which is incorporated herein by reference.

TECHNICAL FIELD

This invention relates generally to conveying systems and, more specifically, to a conveying system that includes carrier chains for transporting packages.

BACKGROUND OF THE INVENTION

A conveying system incorporating one or more carrier chains is commonly used to transport cartons through a packaging machine by which the cartons are erected, loaded, and sealed. Each carrier chain is typically tightened around two sprockets that are spaced apart. The links of the carrier chain engage the teeth of the sprockets and the sprockets rotate to drive the carrier chain. In some applications, a guide track, having surfaces above and below the chain, constrains the movement of the chain to a nearly linear path as the chain moves between the sprockets. The amount of play between the guide track and the chain determines how much the individual links of the chain can rotate or otherwise deviate from the linear path.

A typical carrier chain is a roller chain that includes several different types of links including pin links, roller links, and attachment links. The attachment links are spaced along each roller chain at a regular interval and a support member, such as a lug, is integral or attached to the attachment link.

Each support member supports and abuts a portion of a carton that has been at least partially erected, and cooperates with other support members to transport the carton through a packaging machine where the carton is loaded with articles and folded and secured to form a package. The support members support the carton to keep the corners of the carton substantially square before and during loading and as the end flaps of the carton are closed and glued. The support members can transport the package through the packaging machine by pushing or otherwise causing the package to slide along a flat supporting surface (such as a dead plate or otherwise any stationary support member) of the conveyor. Or the supporting surface can be defined by conveyor plates which are attached to the carrier chains or otherwise are not stationary. As the package slides along the supporting surface of the conveyor, the support members are subjected to numerous opposing forces, such as the frictional forces between the package and the supporting surface, package guides, and flap folding mechanisms, and the forces caused by any change in momentum and/or compression of the package. These opposing forces cause the attachment link to rotate, to the extent allowed by the guide track, and causes the support member to angularly displace relative to a plane that is perpendicular to the support surface or tilt according to the degree of rotation of the attachment link. The play between the guide track and the rollers of the carrier chain allow the attachment link a certain degree of rotation. A large amount of tilt of the support members can cause problems as or after articles are packaged in cartons that are transported by the carrier chains. For example, if the support members tilt excessively, the walls of the cartons are caused to be slanted such that articles are not properly packaged in the carton, articles cannot fit through the opening of the carton, or the walls of the carton are not squared with respect to the support surface as the end flaps of the carton are folded and secured to form end walls.

According to one solution, to compensate for forces applied to a support member that would generate a large degree of tilt, a forward tilt is imposed upon the support member to compensate for the tendency of the support member to tilt rearwardly. Thereby, the displaced or tilted position of the support member generally squares the corners of the package pushing against it. However, the forward tilted support member does not square the corners of an unloaded carton since the unloaded carton generally does not produce as great of an opposing force against the support member as a package that is loaded with articles. As mentioned earlier, a non-square carton can lead to problems during loading. This is especially true for taller cartons where the upper and lower panels of the carton become more offset and can require remedies such as overhead squaring to be introduced into the process.

It is therefore desirable to limit the degree of differential tilt of the support members regardless of the magnitude of the opposing force exerted by either an unloaded carton or loaded package. This has been attempted using several methods. One method for decreasing differential tilt is to tightly control the distance, or play, between the surfaces of the chain guide track and the rollers of the carrier chain. This is expensive from a manufacturing standpoint since a guide track with tighter tolerances requires more precision to manufacture. Additionally, tighter tolerances cause increased contact and friction between the carrier chain and the guide track. As a consequence, the sprockets must supply a greater drive force, which in turn, causes the chain links and guide track to wear out faster. Another method is to increase the pitch of each individual attachment link. However, the pitch of the attachment link is dependent on the characteristics (diameter, spacing between teeth, and the like) of the sprocket that is selected to drive the other links of the carrier chain. Thus, the pitch of the attachment link can only exceed a standard chain link pitch by a limited amount if it is to be used with a sprocket that is designed for use with the standard chain link pitch.

Therefore, a heretofore unaddressed need exists in the industry to address the aforementioned deficiencies and inadequacies. What is needed is an improved carrier chain that reduces the undesirable differential tilt of an attached or integral support member in response to a force is applied to the support member. Further, the carrier chain should be easily manufactured and should have the ability to be incorporated into a standard roller chain.

SUMMARY OF THE INVENTION

The various embodiments of the present invention overcome the shortcomings of the prior art by providing a carrier chain that includes an improved attachment link with a wing that reduces the tilt of an attached support member, such as a lug, which is used for supporting and transporting cartons or packages in a packaging machine. This attachment link is one of a series of rotatably connected links included in a carrier chain and is spaced intermittently throughout the carrier chain, according to application-specific considerations such as the carton widths that must be accommodated. The attachment link may include a vertically extending arm to which a support member can be attached or the support member can be integral to the attachment link.

According to the various embodiments, the carrier chain travels within a guide track system. The attachment link includes a wing that contacts at least one of the adjacent chain links that form the carrier chain, in reaction to a force that is applied to a support member. By contacting at least one of the chain links, the wing limits the rotation of the attachment link, and thereby restricts the rotational displacement of the support member that is attached or integral to the attachment link. Specifically, the wing causes the attachment link and the adjacent link to become interlocked (i.e., fixed in relation to one another) so as to share an axis of rotation without substantially rotating relative to one another and to increase the effective pitch of the combination. The increased pitch of the combination restricts the rotation of the attachment link and the adjacent chain link about the shared axis of rotation within the confines of the guide track.

In certain exemplary embodiments, the attachment link functions as a pin link and is thereby interconnected with roller links. The wing which extends from the attachment link can contact a pin link that is interconnected to the attachment link by a roller link or can contact the roller link itself to restrict the rotation of the attachment link and the roller link relative to one another about a shared axis of rotation.

In alternative embodiments, the attachment link functions as a roller link, and is thereby interconnected with pin links. The wing, which extends from the attachment link, can contact a roller link that is interconnected to the attachment link by a pin link or can contact the pin link itself to restrict the rotation of the attachment link and the pin link relative to one another about a shared axis of rotation.

The attachment link includes a first plate having a base portion from which the wing extends. Specifically, the wing extends in a direction that is opposite the direction of travel of the carrier chain. A lower edge of the wing extends above an upper edge of the plate of the chain link that is contacted by the wing. The lower edge of the wing contacts the upper edge of a plate of a chain link so as to restrict the rotation of the adjacent chain link. In the exemplary embodiment, the attachment link functions as a pin link and the chain link that is contacted by the wing is another pin link. The adjacent chain link is a roller link that shares an axis of rotation with and is interconnected with the attachment link and the contacted pin link. In alternative embodiments, the wing can be arranged to contact the adjacent roller link or other features of the links, including the pins.

The exemplary base portion of the attachment link plate is generally rectangular with rounded ends, while the pin link plates and roller link plates may have a generally hourglass contour. However, the base portion of the attachment link, the pin link plates, and the roller link plates can each be constructed in any suitable shape. Those skilled in the art will appreciate that the maximum pitch of the attachment link is dictated at least in part by the sprocket.

The attachment link plate can include a second wing that is substantially similar to the first wing and extends outward from the base portion in the direction of travel of the carrier chain. Having both wings enables the chain to run in either direction and allows the winged plate of the attachment link to be positioned on either side of the chain. Also, the exemplary attachment link plate includes an arm or other means for attaching a support member that extends from the upper edge of the base portion such that the support member is attached directly to one of the attachment link plates.

Alternatively, the support member can be integral to the attachment link plate and extend from the upper edge of the base portion.

When the attachment link experiences a force that generates rotational motion, the lower edge of the wing makes contact with the upper edge of a pin link. This engagement restricts the rotation of the roller link that connects the attachment link and contacted pin link relative to the attachment link, such that the roller link tends to align and rotate with the attachment link. Since the attachment link and roller link rotate as one, the pitch of the combination is extended, and the rollers at the ends of the arrangement of contacting links react with surfaces of the guide track. In other words, these "reaction rollers" contact the surfaces of the guide track to prevent the attachment link and roller link from rotating further.

The wing effectively reversibly increases the pitch between rollers that contact the surfaces of the guide track, without increasing the pitch of the attachment link, as the attachment link encounters the rotational force. Increasing the pitch between reaction rollers reduces the amount of resultant tilt of the attachment link in the guide track.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 7 is a partial side elevation of a portion of a further embodiment of the carrier chain of FIG. 1.

DETAILED DESCRIPTION

Figure 1:
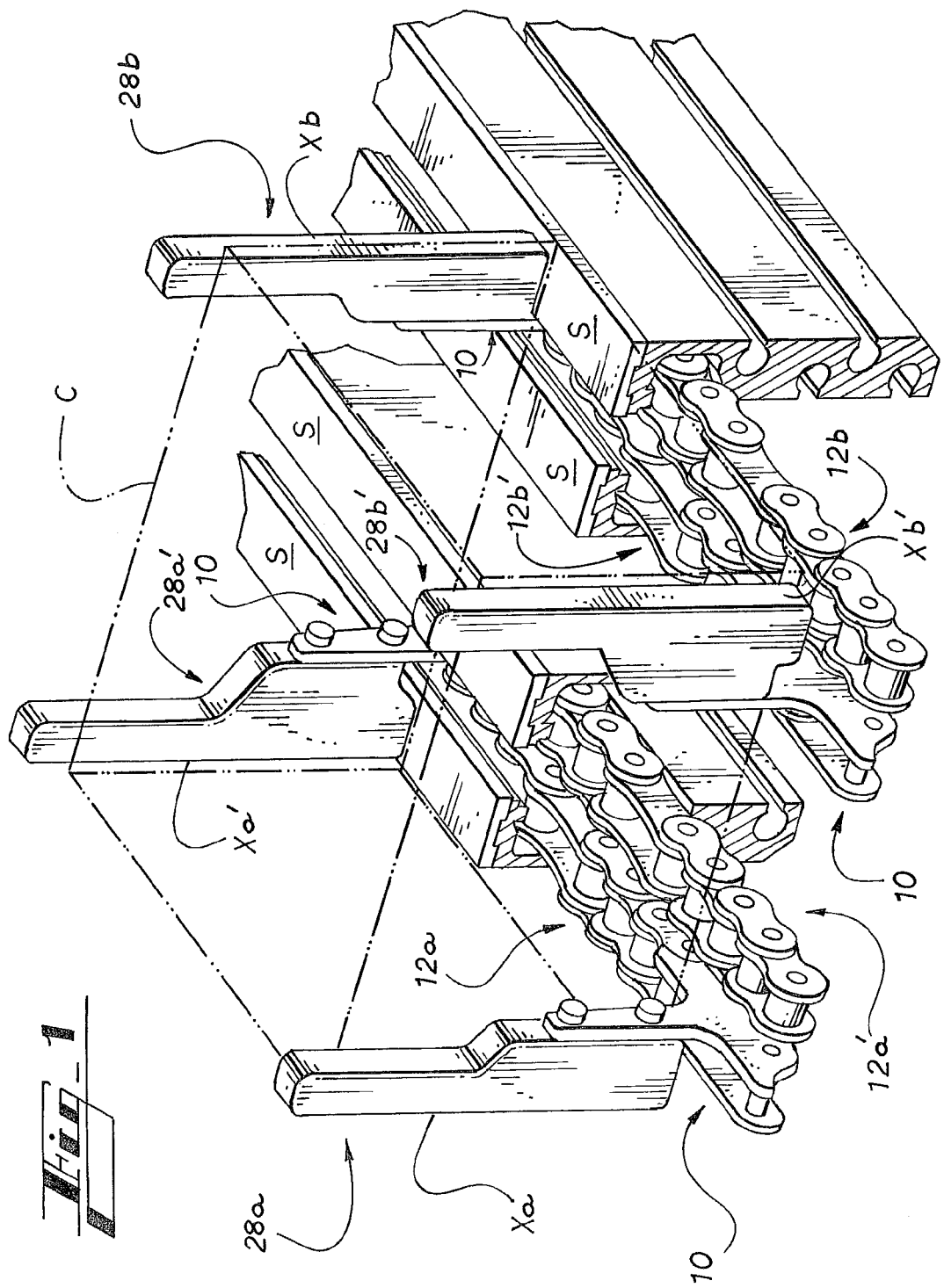
FIG. 1 is a partial perspective view of a conveying system that includes exemplary carrier chains for transporting a package, according to the present invention.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Referring now to the drawings in which like numerals indicate like elements throughout the several views, the drawings illustrate certain of the various aspects of a carrier chain with an exemplary embodiment of the improved attachment link. The attachment link has a wing which functions to limit the tilt of a support member, such as a lug, which is attached or integral to the attachment link. The carrier chain attachment link is illustrated in the context of an exemplary packaging machine that transports cartons or packages. However, it should be understood that the scope of the invention is not limited to packaging machines or to applications involving the transportation of articles. Rather, the invention is applicable to any application where it is desirable to limit or control the tilt of a support member of a carrier chain as a force is applied to the support member.

Referring to FIG. 1, an exemplary conveying system includes a set of carrier chains 12*a*, 12*a'*, 12*b*, 12*b'* that run in parallel and that transport a package 50 (shown in phantom lines) through a packaging machine. The carrier chains and their elements are substantially similar such that suffixes "a", "a'", "b", and "b'" are used to distinguish the carrier chains from one another. The carrier chains with references that include a suffix "a" substantially mirror the carrier chains with references that include a suffix "b". Further, the innermost carrier chains and their corresponding elements are also referenced by a prime symbol. For example, the outer carrier chain on one side is labeled 12*a* and the adjacent inner carrier chain on that side is labeled 12*a'*. For simplicity, a description of the elements of one carrier chain will be provided since the description of the carrier chain is generally applicable to the other carrier chains. In addition, a description of the relationship between carrier chains that include a suffix "a" is generally applicable to carrier chains that include a suffix "b" since the sets of chains substantially mirror one another.

To establish a frame of reference, without limitation, the working section of each carrier chain will be described as traveling along a hypothetical linear course in the horizontal plane, although other orientations and configurations are contemplated, and any part of or the entire path of the carrier chains may include curves, bends, and other diversions as the application dictates. Moreover, it is contemplated that in certain embodiments, the working section of each carrier chain may be routed above conveying articles so that the support members extend downwardly from the working section to engage the articles. Furthermore, all of the carrier chains are described as traveling along parallel paths that together define the drive train for conveying articles on a single conveying surface, as is described in more detail below. Thus, the term "outward" indicates proceeding or directed away from the center of the conveying surface, and "inward" indicates proceeding or directed toward the center of the conveying surface.

The carrier chains 12*a*, 12*a'* carry mounted or integral support members that support and transport articles. In the exemplary embodiment, the support members are lugs 28*a*, 28*a'* that are dimensioned and positioned for supporting and transporting a carton C. The carrier chains 12*a*, 12*a'* are adjacent to one another and run in parallel and the lugs 28*a*, 28*a'* extend from respective carrier chains 12*a*, 12*a'* so as to be aligned as they move in the direction of travel. Each lug is mounted or integrally attached along its inward facing edge, and has an end edge that is suspended above the horizontal plane in which the carrier chain travels. In the exemplary embodiment, the suspended portions of the lugs 28*a* extend outwardly from the inside edge of the outer carrier chain 12*a* and the suspended portions of the lugs 28*a'* extend outwardly from the outside edge of the inner carrier chain 12*a'* such that each of the lugs 28*a*, 28*a'* is disposed and aligned above the outer carrier chain 12*a*. Further, the lugs 28*a'* that extend from the inner chain 12*a'* are greater in width than the lugs 28*a* that extend from the outer chain 12*a* such that the outward facing outer surfaces Xa, Xa' of the lugs 28*a*, 28*a'* are substantially coplanar. This arrangement is of utility in carton-loading process wherein the lugs 28*a*, 28*a'* are used to guide the folding of the opposed side end flaps of cartons C. In alternative embodiments, the lugs can be alternatively dimensioned or positioned to support and transport a carton with other dimensions or other articles. Thereby, the dimension and position of the support members that extend from each of the carrier chains is a design decision that is dependent on the application.

In the exemplary embodiment, each lug 28*a* is a tapered block formed of plastic, although its shape, size, and constituent material are design choices dictated by the application. Those who are skilled in the art will understand that each lug 28*a* can be formed from a variety of materials into a variety of sizes and shapes in order to provide the necessary spacing and support when conveying a carton C, as shown in FIG. 1.

The lugs 28*a*, 28*a'* are aligned in an alternating series with a carton C disposed therebetween such that a lug 28*a* which extends from the carrier chain 12*a* supports the leading end of the carton C (shown in phantom lines) and a lug 28*a'* which extend from the carrier chain 12*a'* supports the trailing end of the carton C. The carrier chains 12*a*, 12*a'* are separately driven such that the chains 12*a*, 12*a'* can be phased or adjusted relative to one another to vary the distance between lugs 28*a*, 28*a'*, for example, to accommodate packages of different sizes. Carrier chains 12*b*, 12*b'* are similarly driven by separate drive means.

Figure 2:
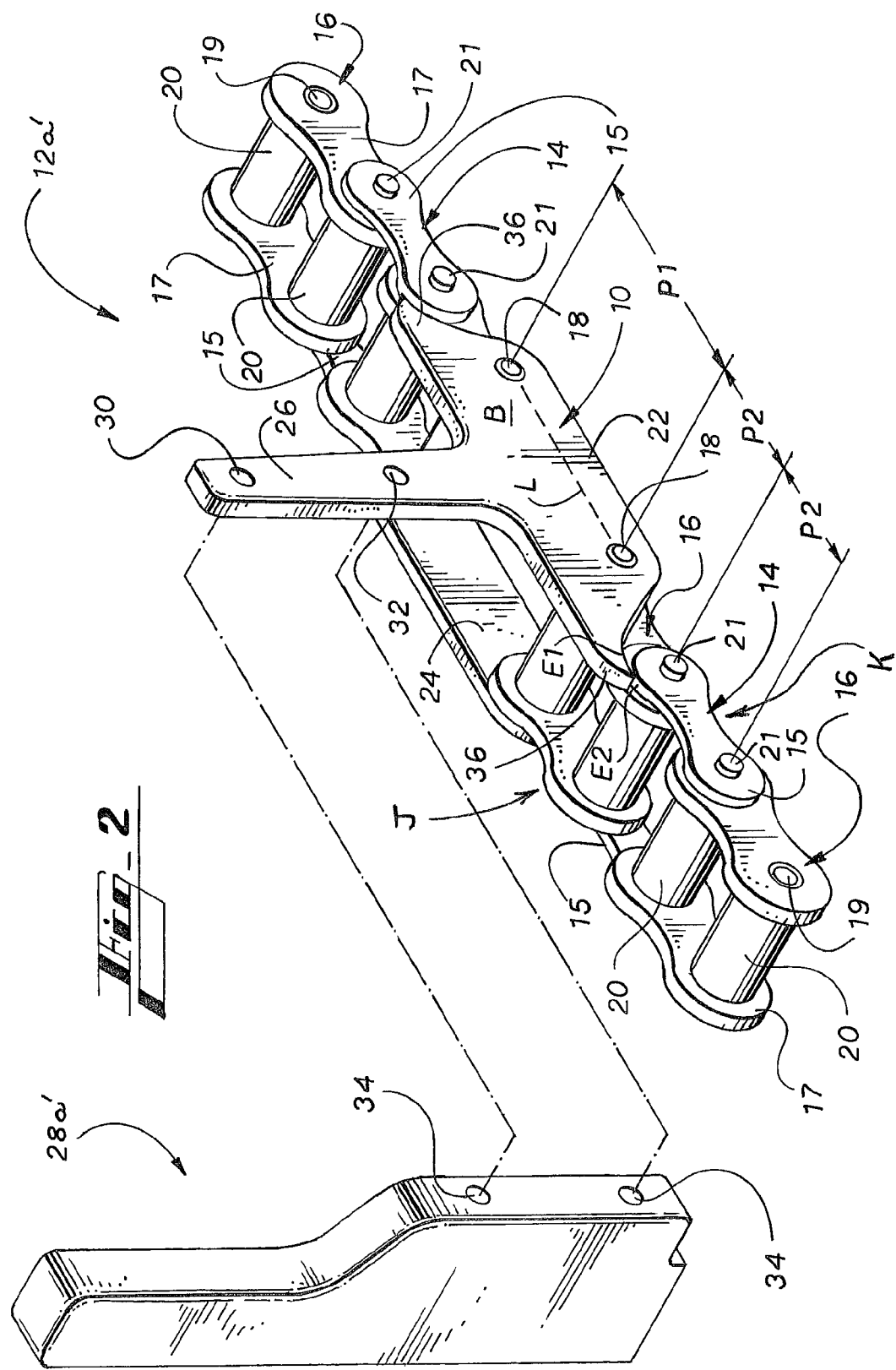
FIG. 2 is a partially-exploded perspective view of a portion of one of the carrier chains of FIG. 1.

Referring to FIG. 2, one of the carrier chains 12*a* is now further described. The carrier chain 12*a* is a roller chain, which is generally known in the art, which comprises a repeating series of attachment links 10, pin links 14, and roller links 16. A typical carrier chain includes an alternating series of rotatably connected pin links 14 and roller links 16. Referring to FIG. 2, each pin link 14 is connected between two roller links 16 as the pins 21 of the pin link 14 are received in the bushings 19 of the adjacent roller links 16. As a pin is received in a bushing, the central axis of the pin and the central axis of the bushing are substantially aligned such that the central axes define an axis of rotation about which the pin link and the roller link can rotate relative to one another. According to certain embodiments of the present invention, the attachment links 10 function as pin links 14 in that they are rotatably connected with roller links 16. Thus, the attachment links 10 can be substituted for certain pin links 14 in the carrier chain 12*a* such that the attachment links 10 and the adjacent roller links 16 can rotate relative to one another, according to the desired spacing or pitch between lugs for each carrier chain, as will be described in greater detail below. Those skilled in the art will understand that an attachment link 10 may be used as part of many types of chain including, but not limited to, a standard power transmission roller chain, and that the attachment link 10 may alternatively function as a roller link disposed between pin links 14.

The attachment link 10 and the pin link 14 each include two plates that are secured together. More specifically, each attachment link 10 includes a first attachment link plate 22 and a second attachment link plate 24 that are secured to one another at or near the ends of a pair of pins 18. The attachment link plates 22, 24 can be fashioned using any system, method, and material for making a link plate having the properties and components described herein including, but not limited to, laser cutting, punching, or machining from heat-treated steel.

In the exemplary embodiments shown in the figures, the pins 18 extend at least partially through apertures in the attachment link plates 22, 24 and are riveted or knurled such that the ends of the pins 18 cannot slide out of the apertures in the attachment link plates 22, 24. It should be understood that, in alternative embodiments, any method of or means for securing the ends of the pins 18 to the attachment link plates 22, 24 may be used including, but not limited to, T-pins, cotter pin joints, spring clips, or pressure fitting. Similarly, each pin link 14 includes two pin link plates 15 that are secured at or near the ends of pins 21. The ends of the pins 21 can be secured to the pin link plates 15 using any method of securing as described for the attachment link 10.

Roller links 16 each include two roller link plates 17 that are secured at or near the ends of bushings 19. The bushings 19 can be press fit into holes in the roller link plates 17 to secure the roller link plates 17 to the ends of the bushings 19. In alternative embodiments, the ends of the bushings 19 can be secured to the roller link plates 17 using any method of securing as described for the attachment link 10. Rollers 20 are disposed on the bushings 19 to facilitate engagement of the carrier chain 12a with associated sprockets (not shown). The rollers 20 can rotate on a respective bushing 19 to facilitate movement of the carrier chain 12a around the sprockets and through the guide track.

In the embodiments shown, a pitch P1 of attachment link 10 is approximately double a pitch P2 of the links 14, 16. The pitch P1 is defined as the distance between the central axes of the pins 18. The pitch P2 is defined as the distance between the central axes of the pins 21 for pin links 14 and as the distance between the central axes of the coaxial bushings 19 and rollers 20 for the roller links 16. Preferably, but not necessarily, the pitch P2 of each link 14, 16 conforms to American National Standards Institute (ANSI) standards and corresponds to the size of the sprocket used in the particular application. The pitch P1 can be greater than the pitch P2 by a limited amount and still work with a sprocket that is designed for a pitch P1. As described in further detail below, increasing the pitch P1 of the attachment link 10 functions to reduce the maximum angle of rotation of the attachment link 10. However, it should be noted that, in certain embodiments, the pitch P1 is no greater than and could conceivably be less than the pitch P2. The various embodiments include a wing on the attachment link 10 that functions to reduce the maximum angle of rotation of the attachment link 10 and thereby to reduce the tilt of the lug 28a.

In the exemplary embodiments, the first attachment link plate 22 includes means for attaching a support member, such as the lug 28a. The exemplary means for attaching is a bracket arm 26 that is an integral extension of the first attachment link plate 22. The bracket arm 26 is located intermediately, if not centered, between the pins 18 of the respective attachment link 10 and extends upwardly from a base portion B of the first attachment link plate 22 in a direction that is generally perpendicular to an imaginary line L, which extends between the pins 18 of the attachment link 10. In alternative embodiments, the bracket arm 26 may be angled with respect to the imaginary line L to accommodate an irregularly shaped carton or to compensate for an acceptable degree of differential tilt.

To facilitate attaching the detachable lug 28a to the attachment link 10, in the exemplary embodiment, the bracket arm 26 includes a slot aperture 30 that is at least slightly elongated and a relatively close fitting round aperture 32 that extend through the arm 26. The slot aperture 30 allows compensation for slight deviations in manufacturing tolerances. The lug 28a is fastened to the bracket arm 26 with fastening means such as bolts, pins, or screws that are passed through apertures 30, 32 and inserted or threaded into holes 34. As mentioned above, the bracket arm 26 may be angled to tilt the lug 28a somewhat. Alternatively, or in addition, the holes 34 may be skewed to position the lug 28a to have a forward tilt relative to the bracket arm 26. In applications that require a titled lug, the angle of forward tilt is determined such that, when the lug 28a engages a loaded carton or is otherwise subjected to a rotational force, the angle of rotation of the attachment link 10 or of the bracket arm 26 offsets the forward tilt and the lug 28a is substantially normal to a supporting surface on which the carton C is disposed. It is contemplated as well that some applications may tolerate a small degree of backward tilt of a loaded lug, in that the forward tilt only partially compensates for the backward rotation encouraged by the working forces. It should be noted that any means for attaching the lug 28a onto the bracket arm 26 can be used including, but not limited to, chemical bonding, adhesives, mechanical fasteners, welding, riveting, or pinning. In an alternative embodiment, the lug 28a may be a preformed integral extension of the attachment link plate 22. In another alternative embodiment, the lug 28 may be composed of two separate parts, i.e., a base part secured to the attachment link 10 and a quick change extension part detachably engaged with the base part by means, for example, of a key-and-groove connection.

Figure 3:
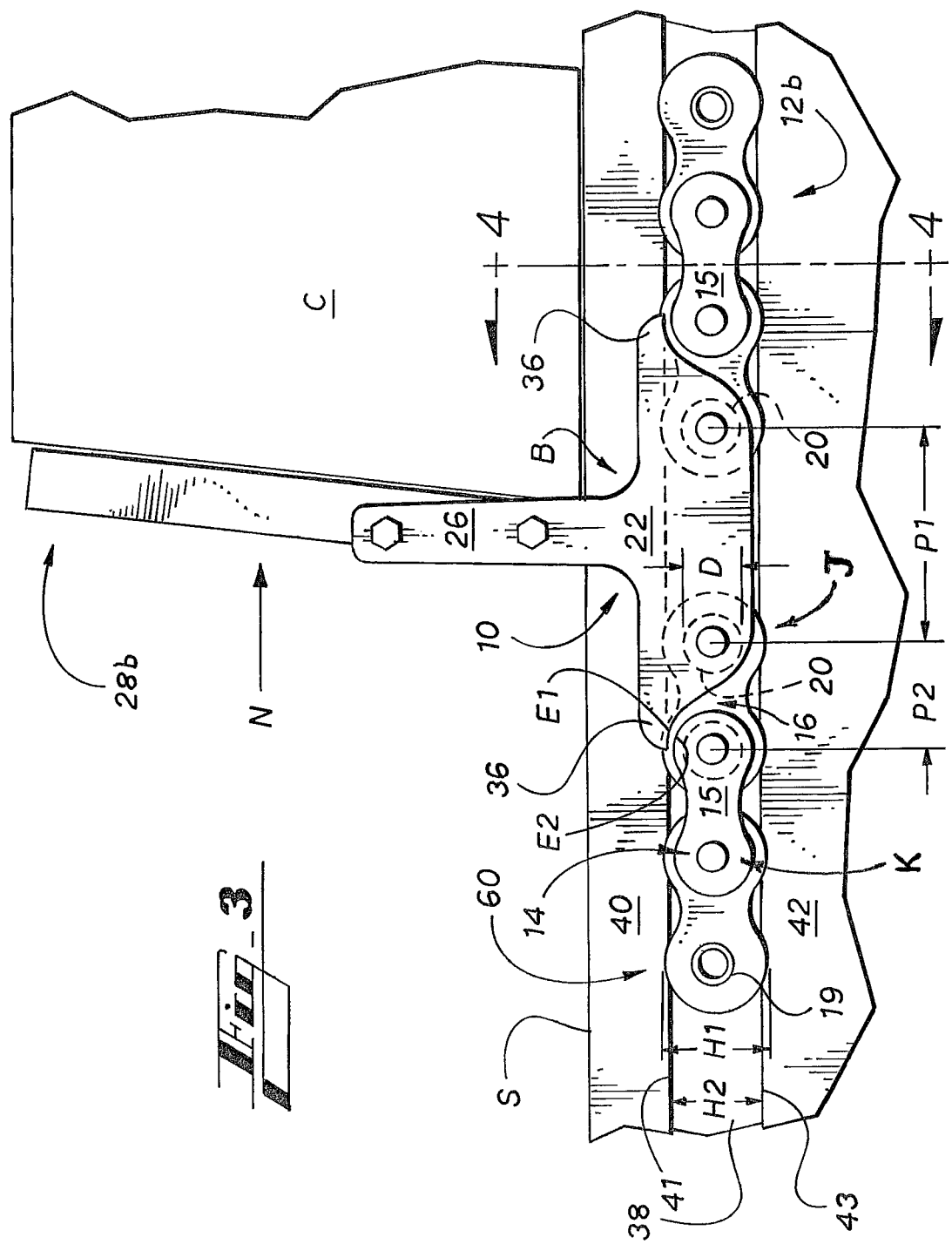
FIG. 3 is a partial side elevation of a portion of one of the carrier chains of FIG. 1, showing the relationship of the carrier chain with a guide track.

With reference to FIGS. 1-3, the first attachment link plate 22 includes wings 36 that extend from opposite ends of a base portion B of the first attachment link plate 22. Referring to FIG. 3, each wing 36 is dimensioned and positioned such that, with the attachment link 10 is incorporated in the carrier chain 12a, the lower edge E1 of the wing 36 is disposed adjacent to or above a portion an upper edge E2 of a pin link plate 15 of the adjacent pin link 16. Additionally, the contour of the lower El edge of each wing 36 closely conforms to the contour of the portion of the upper edge E2 of the pin link plate 15 of the adjacent pin link 16. In the exemplary embodiment, the wings 36 are contoured to closely complement the contour of the adjacent pin link plate 15. In alternative embodiments, each wing 36 may have any shape, such as the shape of a curved ledge or a cantilever beam, so long as it maintains the functionality described herein. In addition, the shape of the wings 36 may be altered to conform to pin link plates 15 of different sizes and shapes. As described in further detail below, the contour of the lower edge El of each wing 36 is selected to engage an upper edge E2 of the pin link plate 15 of the adjacent pin link 16 to limit the angle of rotation of the attachment link 10 and a lug 28a attached thereto.

It should be understood that the wings 36 are included at or near each of the opposite ends of the base portion B as an option so that the carrier chain 12a is directionally reversible. However, in certain embodiments, only the trailing (upstream) end of the base portion B includes a wing 36. It should also be understood that the second attachment link plate 24 of the attachment link 10 can include at least one wing 36 and that either of the attachment link plates 22, 24 can include one or both of the wing and bracket arm features. Further, in the exemplary embodiment, the wings 36 and the bracket arm 26 are integral to the first attachment link plate 22. In alternative embodiments, the wings 36 and/or the arm 26 may be attached to the base portion B of the first attachment link plate 22 by any method including, but not limited to, welding or bolting.

Figure 4:
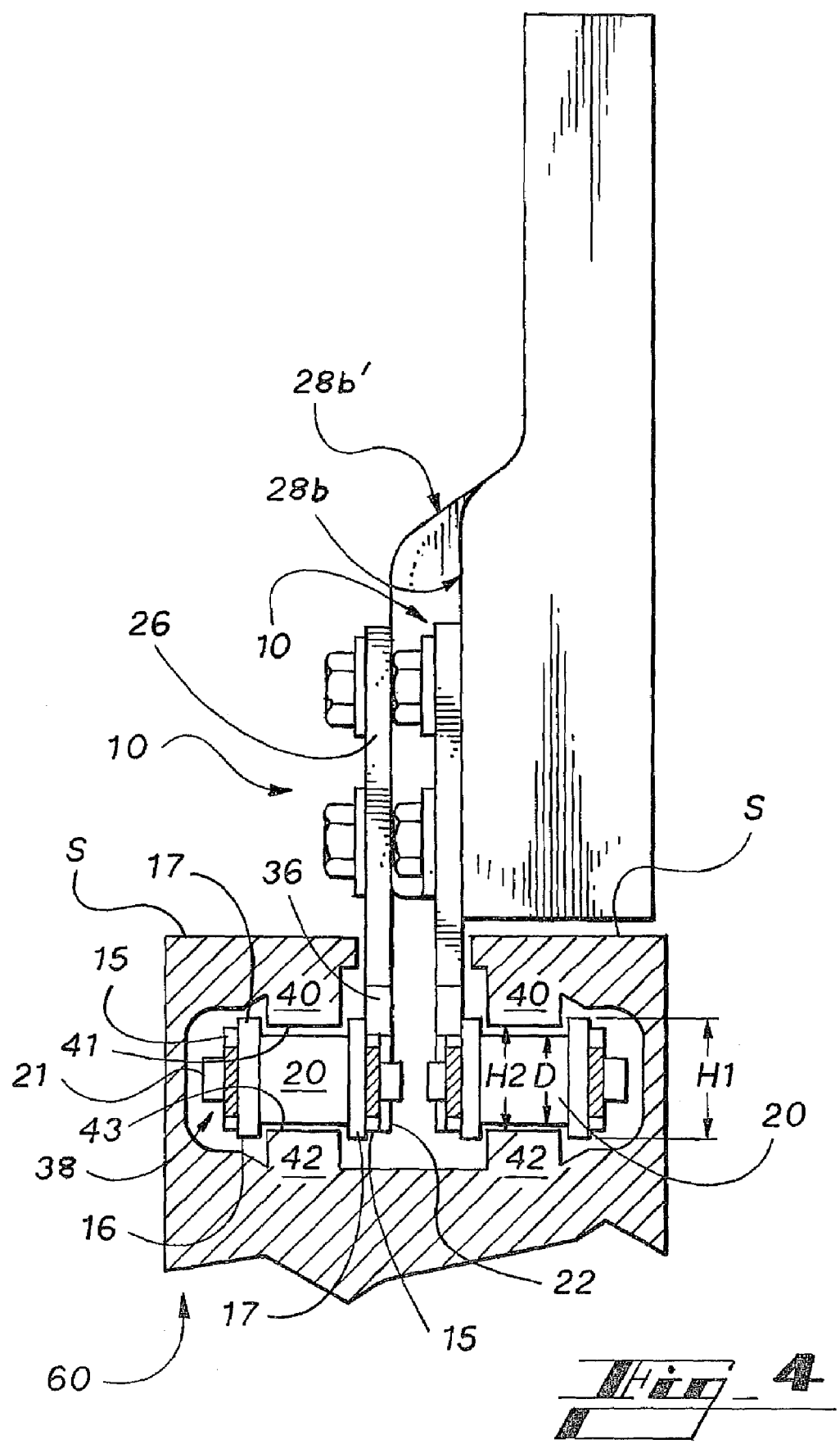
FIG. 4 is an end elevation taken along the line IV-IV in FIG. 3, showing the relationship of the carrier chain to the guide track.
Figure 5:
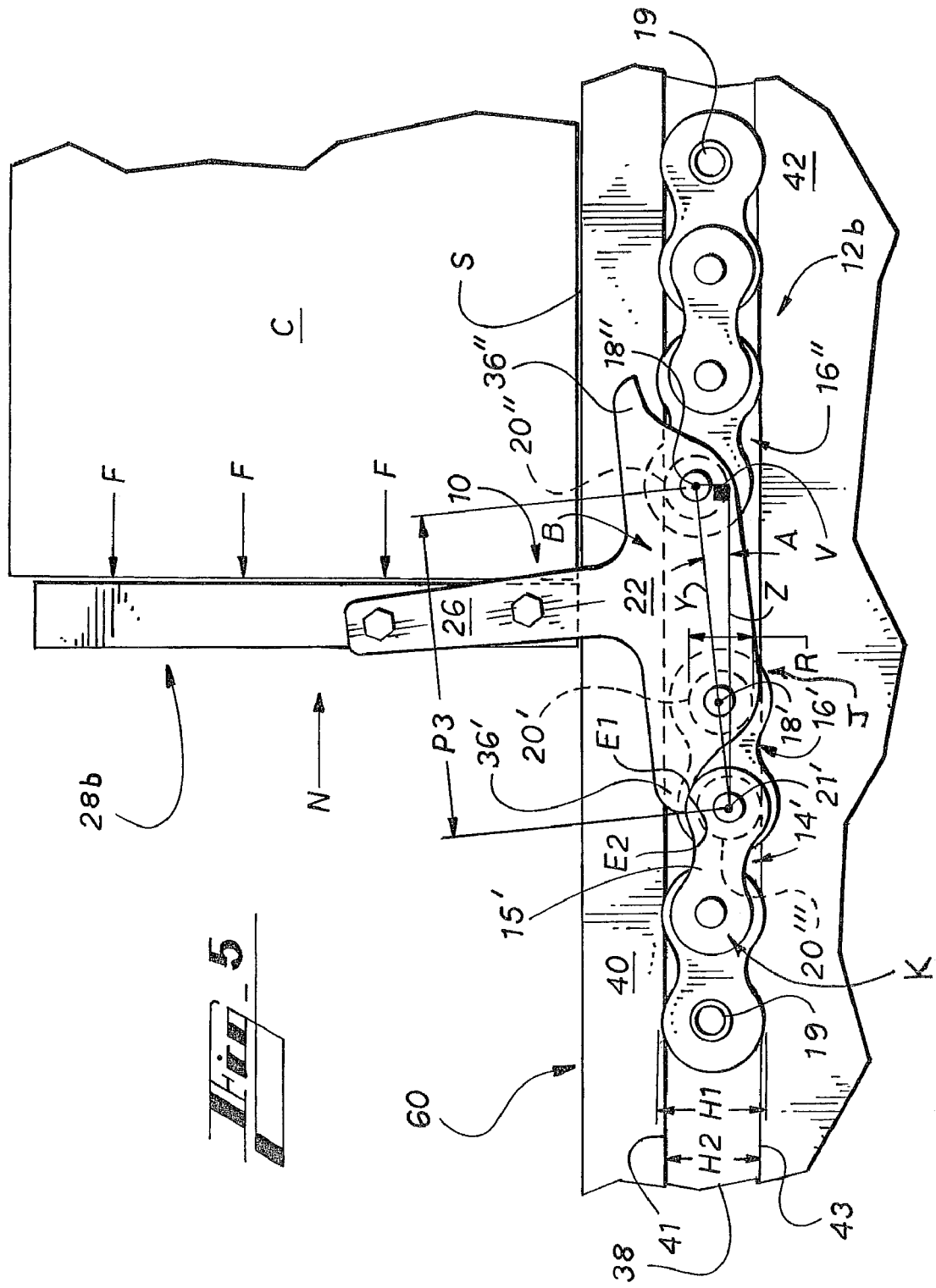
FIG. 5 is a partial side elevation of a portion of one of the carrier chains of FIG. 1, showing the function of a wing of an attachment link.

Referring to FIGS. 3-5, a chain guide 60 includes a guide track 38 that constrains the movement of the carrier chain 12a as it travels between sprockets (not shown) or otherwise prevents the carrier chain 12a from leaving the substantially linear or otherwise intended path defined by the guide track 38. The guide track 38 is substantially parallel to a direction of travel N of the carrier chain 12a and includes an upper section 40 with an upper surface 41 and a lower section 42 with a lower surface 43. As best shown in FIG. 4, the links 10, 14, 16 straddle the upper section 40 and the lower section 42, with the upper surface 41 and the lower surface 43 being adjacent to, but not necessarily in contact with, upper and lower surfaces of the rollers 20, respectively. The upper section 40 and the lower section 42 are disposed between the inside surfaces of roller link plates 17 to restrict the lateral movement of the carrier chain 12a or otherwise keep the carrier chain 12a in the guide track 38. The distance between the upper and lower surfaces 41, 43 is determined so as to restrict the vertical displacement and angle or rotation of the links 10, 14, 16 without making the tolerances too tight so as to undesirably increase friction and wear on the guide track 38 and associated carrier chain 12a components. Accordingly, the maximum height H1 of each roller link plate 17 is greater than the height H2 of the guide track 38 and the diameter D of the roller 20 is less than the height H2 of the guide track 38.

The function of the wings 36 of the attachment link 10 will now be described. For the purpose of clarity, certain elements of the carrier chain 12 including outside links 14, inside links 16, rollers 20, and wings 36 will be accented with a prime symbol to denote a specific element in the carrier chain in relation to the attachment link 10. Like elements, starting from the attachment link 10 and moving in the direction opposite the line of travel N, will be given an increasing odd number of prime accents. Like elements, starting from the attachment link 10 and moving in the direction of travel N, are given an increasing even number of prime accents. Additionally, for clarity, the rollers 20 that are in contact with the surfaces 41, 43 of the guide track 38 will be referred to as reaction rollers.

A force F is exerted against lug 28 as the lug 28 transports the carton C over a surface S and otherwise supports the carton C. The force F causes the attachment link 10 to rotate in a counterclockwise direction as shown from the perspective of FIGS. 3 and 5. Let it be noted that force F is also generated on an unloaded lug 28a simply by virtue of the acceleration of the carrier chain 12a and the length and mass of the lug 28a.

Figure 6:
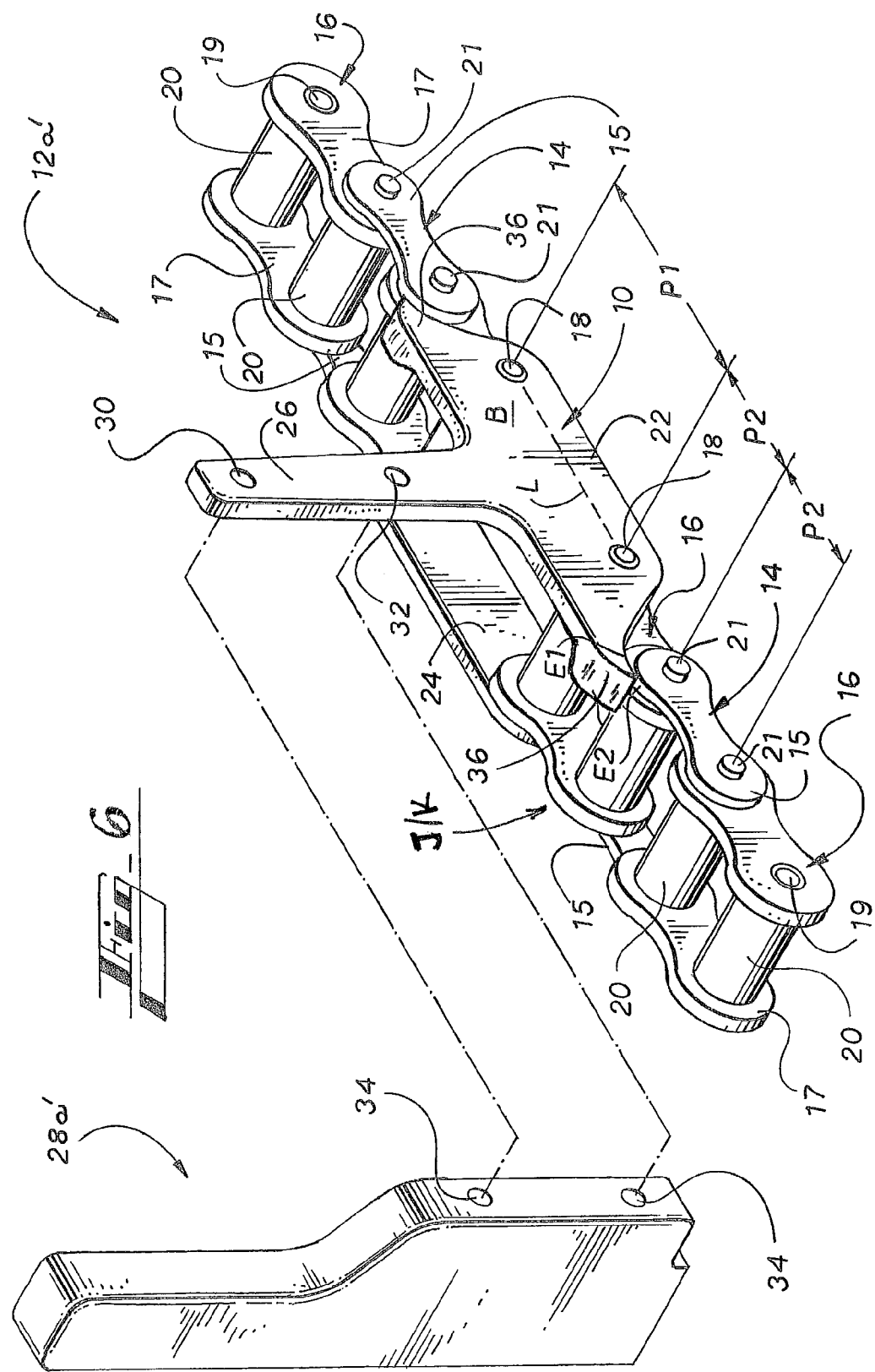
FIG. 6 is a partially-exploded perspective view of a portion of a further embodiment of the carrier chain of FIG. 1.

Referring to FIG. 5, as the attachment link 10 begins to rotate, and indeed rotates beyond a prescribed or predefined acceptable degree of rotation, the lower edge E1 of wing 36' abuts or otherwise contacts the upper edge E2 of the one of the links in the carrier chain 12a. This contact link K can be the adjacent link J to which the attachment link 10 is directly connected (as shown in FIGS. 6 and 7), or the contact link K can be another of the series of links that forms the carrier chain 12a (as shown in FIGS. 1-5). In the first embodiment, and as best shown in FIG. 5, the attachment link 10 contacts a pin link plate 15' of the pin link 14'. This contact resists the tendency of the end of the adjacent link J (roller link 16', which is connected to the pin link 14') to rotate further relative to the attachment link 10, in a clockwise direction from the perspective of FIGS. 3 and 5, about an axis of rotation that is defined by the central axis of the pin 18'. Thereby, as the attachment link 10 is further rotated in a counterclockwise direction, the roller link 16' is constrained to be substantially in line with the attachment link 10 as it tilts. For example, in certain embodiments, the pins 18', 18'', 21' are aligned as the attachment link 10 and the constrained roller link 16' contact one another, and potentially, rotate together.

The roller 20''' becomes the reaction roller, as it is disposed against the lower surface 43 and the attachment link 10 and the roller link 16' are rotated as one in a counterclockwise direction about an axis of rotation that is defined by the central axis of the pin 21'. Similarly, the roller 20'' becomes the reaction roller against the upper surface 41. Referring to FIG. 5, as the reaction rollers 20'', 20''' are in contact with the upper and lower surfaces 41, 43, respectively, the roller 20' is offset from or otherwise not in contact with either of the surfaces 41, 43. A line Y that is defined between the pins 18'', 21' is at an angle with respect to the horizontal plane or otherwise with respect to a line Z that is parallel to or defined by the upper or lower surface 41, 43. The line Z can be defined by the pins 18'', 21' as the rollers 20'', 20''' are both in contact with the lower surface 43. Thus, the angle between the line Z and the line Y represents a maximum permissible angle of rotation A, which may be infinitesimal and is preferably acute.

Referring to FIG. 5, an imaginary right triangle can be formed by a vertical line V which extends from the upper end of the line Y to intersect the line Z. Thereby, the line Y is the hypotenuse and the lines V, Z are perpendicular to one another. The vertical line V is equal to a vertical distance between the reaction rollers 20'', 20''' as they are in contact with the upper and lower surfaces 41, 43, respectively. Further, the length of the line Y which defines the hypotenuse is equal to the pitch P3 between the reaction rollers 20'', 20'''. The pitch P3 is substantially equal to the pitch P1 of the attachment link 10 plus the pitch P2 of the adjacent link J (roller link 16').

In contrast, it should be understood that, if the wing 36' was not present, the attachment link 10 would rotate until the rollers 20', 20'' came into contact with the lower and upper surfaces 43, 41, respectively. The vertical distance between the rollers 20', 20'' would be the same but the length of the hypotenuse of the resulting right triangle would have a length substantially equal to the pitch P2 which is defined between the pins 18', 18''.

It should be understood that increasing the length of the hypotenuse decreases the angle of rotation A if the vertical line V remains constant. Accordingly, the angle of rotation A is less if the length of the hypotenuse is equal to the length of the pitch P3 rather than the length of the pitch P2.

For illustrational purposes, the amount of tilt of the attachment link 10 and the clearance between the rollers 20 and the upper and lower sections 40, 42 are exaggerated in FIGS. 3 and 5.

The principles of the invention are capable of application in innumerable alternative embodiments and permutations of embodiments. In each of these embodiments shown in FIGS. 6 and 7, for example, the chain link that is contacted (i.e., the contact link K) is a roller link (16), which may or may not be the adjacent link J to which the attachment link 10 is directly connected. In the embodiment shown in FIG. 6, the wing 36 is enlarged in thickness and extends over the adjacent link J/K (here, a roller link 16) so as to contact an upper edge of one of its end plates in response to a force applied to the support member (not shown). Thus, the roller link 16 is both the contact link K and the adjacent link J to which the attachment link 10 is directly connected. In the embodiment shown in FIG. 7, the wing 36 is rotatably connected directly to a pin link 14, so the attachment link 10 functions as a roller link, and the end plate 15 of the pin link 14 is disposed on the outside of the attachment link plate 22. The bottom edge E1 of the wing 36 is disposed above the upper edge E2 of the contact link K (here, roller link 16) so as to contact an upper edge of one of its end plates in response to a force applied to the support member (not shown). It is further contemplated that the attachment plate 10 may contact both the adjacent link J and at least one other chain link that is connected to the adjacent link, and thus there may be multiple contact links K for any one wing 36. It is also contemplated that the support member can be connected to the plate 24 rather than the plate 22 bearing the wing 36.

It must be emphasized that the above-described embodiments are merely exemplary illustrations of implementations set forth for a clear understanding of the principles of the invention. Many variations and modifications may be made to the above-described embodiments without departing from the scope of the claims. All such modifications, combinations, and variation are included herein by the scope of this disclosure and the following claims.

What is claimed is:

1. An attachment link for carrying a support member, the attachment link being linkable in a series of rotatably connected chain links to form a carrier chain, the attachment link comprising a wing for contacting at least one of said chain links in reaction to a force applied to the support member so as to restrict the rotational displacement of the support member by restricting the rotation of the attachment link and the adjacent link relative to one another;
    wherein said wing is configured such that, when said attachment link contacts said one of said chain links, said adjacent link is interlocked with said attachment link such that the adjacent link and the attachment link share an axis of rotation.

2. The attachment link of claim 1, further comprising a first plate having a base portion that is connected on its trailing end to an adjacent link;
    wherein the wing extends from said base portion in a direction opposite a direction of travel of the carrier chain.

3. The attachment link of claim 2, further comprising a second wing that extends from said base portion in the direction of travel of the carrier chain.

4. The attachment link of claim 2, wherein said attachment link comprises:
    a second plate; and
    pins extending between said first plate and said second plate;
    wherein said adjacent link is a roller link and said one of said chain links is a pin link.

5. The attachment link of claim 2, wherein said attachment link comprises:
    a second plate; and
    bushings extending between said first plate and said second plate;
    wherein said adjacent link is a pin link and said one of said chain links is a roller link.

6. The attachment link of claim 1, wherein said one of said chain links that is for being contacted by the attachment link is the adjacent chain link.

7. An attachment link for carrying a support member, the attachment link being linkable in a series of rotatably connected chain links to form a carrier chain, the attachment link comprising:
    a wing for contacting at least one of said chain links in reaction to a force applied to the support member so as to restrict the rotational displacement of the support member; and
    a first plate having a base portion that is connected on its trailing end to an adjacent link;
    wherein:
        the wing extends from said base portion in a direction opposite a direction of travel of the carrier chain; and
        said one of said chain links includes a contact plate that is substantially coplanar with the first plate of the attachment link.

8. The attachment link of claim 7, wherein a lower edge of said wing extends above an upper edge of said contact plate and said lower edge is for contacting said upper edge so as to restrict the rotation of said attachment link.

9. A carrier chain, comprising:
    a series of rotatably connected chain links;
    wherein at least one of said chain links is an attachment link rotatably connected in said series, the attachment link comprising:
        a base portion; and
        a wing portion that extends from said base portion toward one of said links that is upstream from said attachment link;
    wherein:
        a lower edge of the wing portion, which extends over an upper edge of said one of said links, so as to contact said one of said links if the attachment link rotates; and
        the attachment link has a pitch that is greater than the pitch of said one of said links.

10. The carrier chain of claim 9, wherein the attachment link further comprises means for attaching a support member to the attachment link, the support member being for engaging a carton.

11. The carrier chain of claim 10, wherein said means for attaching comprises a bracket arm portion that extends from an upper edge of the base portion.

12. The carrier chain of claim 10, wherein the support member comprises a lug.

13. The carrier chain of claim 9, wherein the base portion is elongated.

14. The carrier chain of claim 9, wherein the wing portion is for limiting to a predefined permissible degree the rotation of the attachment link with respect to the line of travel of the carrier chain by contacting said one of said links.

15. The carrier chain of claim 14, wherein said means for attaching the support member is configured to tilt the support member in the downstream direction to a degree that is related to the permissible degree of tilt of the attachment link.

16. The carrier chain of claim 9, wherein the attachment link further comprises a support member integral to the attachment link and extending from the upper edge of the base portion.

17. The carrier chain of claim 9, wherein the attachment link further comprises a second wing portion that extends outward in the direction of travel from the leading end of the base portion.

* * * * *